(12) United States Patent
Konieczny

(10) Patent No.: US 7,100,758 B2
(45) Date of Patent: Sep. 5, 2006

(54) DEVICE FOR CLAMPING AND HOLDING AN ELONGATED WORKPIECE

(75) Inventor: David J. Konieczny, Union Mills, IN (US)

(73) Assignee: SSD Control Technology, Inc., South Bend, IN (US)

( * ) Notice: Subject to any disclaimer, the term of this patent is extended or adjusted under 35 U.S.C. 154(b) by 0 days.

(21) Appl. No.: 10/999,332

(22) Filed: Nov. 30, 2004

(65) Prior Publication Data

US 2005/0077669 A1 Apr. 14, 2005

Related U.S. Application Data

(60) Division of application No. 10/647,765, filed on Aug. 25, 2003, now Pat. No. 6,823,979, which is a division of application No. 09/813,478, filed on Mar. 21, 2001, now Pat. No. 6,648,120, which is a continuation-in-part of application No. 09/081,223, filed on May 19, 1998, now Pat. No. 6,231,036.

(51) Int. Cl.
*B65G 15/64* (2006.01)
(52) U.S. Cl. .............................. 198/345.1; 198/468.2; 269/55
(58) Field of Classification Search ............. 198/345.1, 198/836.3, 468.2; 269/229, 910, 56, 55, 269/13, 14
See application file for complete search history.

(56) References Cited

U.S. PATENT DOCUMENTS

| | | | |
|---|---|---|---|
| 2,681,758 A | 6/1954 | Lipson | |
| 4,084,498 A | 4/1978 | Weaver | |
| 4,638,756 A | 1/1987 | Collmann | |
| 4,860,439 A | 8/1989 | Riley | |
| 5,099,979 A | 3/1992 | Kehrel | |
| 5,353,910 A | 10/1994 | Harris et al. | |
| 5,382,154 A | 1/1995 | Morikawa et al. | |
| 5,520,276 A | 5/1996 | Aoki et al. | |
| 5,566,466 A | 10/1996 | Hearne | |
| 5,697,490 A | 12/1997 | Raque | |
| 5,829,571 A | 11/1998 | Mizuta et al. | |
| 5,873,566 A | 2/1999 | Cadwallader et al. | |
| 5,944,477 A | 8/1999 | Shill | |
| 6,231,036 B1 * | 5/2001 | Johnson et al. | 198/345.1 |
| 6,354,581 B1 | 3/2002 | Johnson et al. | |
| 6,378,695 B1 | 4/2002 | Rinne | |
| 6,648,120 B1 * | 11/2003 | Konieczny | 198/345.1 |
| 6,823,979 B1 * | 11/2004 | Konieczny | 198/345.1 |

* cited by examiner

*Primary Examiner*—James R. Bidwell
(74) *Attorney, Agent, or Firm*—Marshall, Gerstein & Borun LLP

(57) ABSTRACT

A device for receiving and processing an elongated workpiece that proceeds along a path is disclosed. The device comprises a plurality of clevis-shaped members, each clevis-shaped member being pivotable about a vertical axis and having a pair of spaced apart upwardly extending posts. The clevis-shaped members are spaced apart relative to the path, and the posts of each clevis-shaped member defining therebetween a centered workstation disposed along the path. At least one actuator is provided, with the actuator operatively engaging each of the clevis-shaped members such that the each clevis-shaped member will pivot about its vertical axis. Accordingly, in response to operation of the actuators the posts of each of the clevis-shaped members shift in unison to center and clamp the workpiece at the workstation.

11 Claims, 14 Drawing Sheets

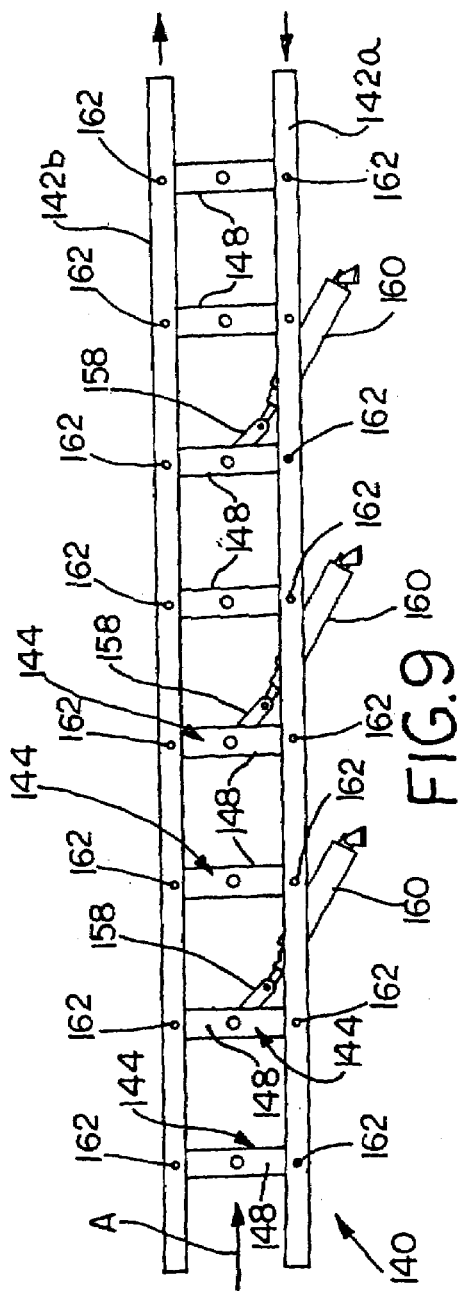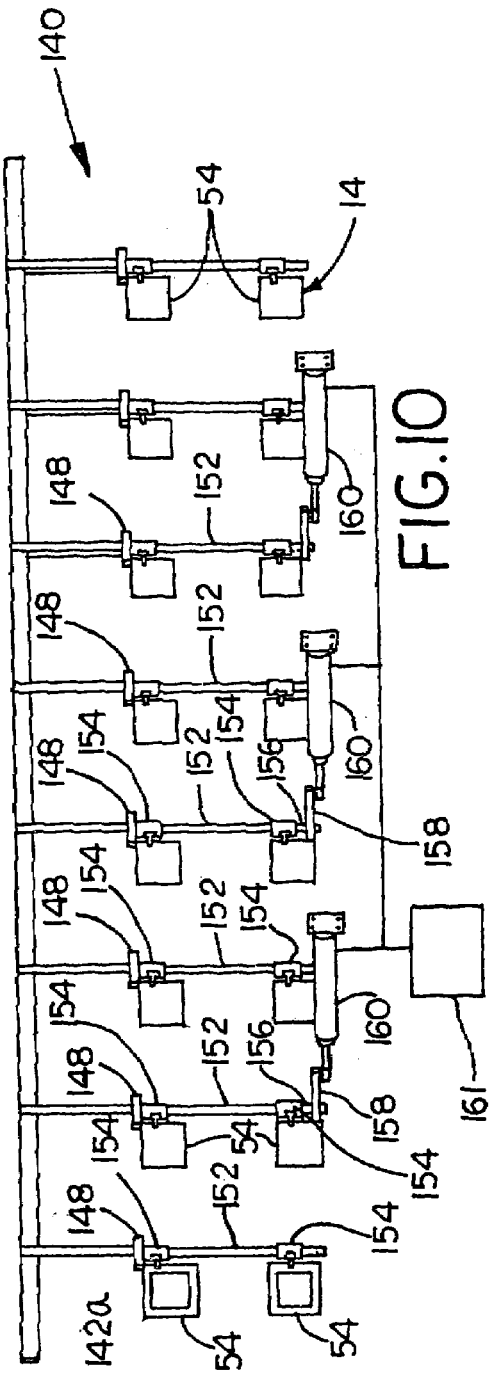

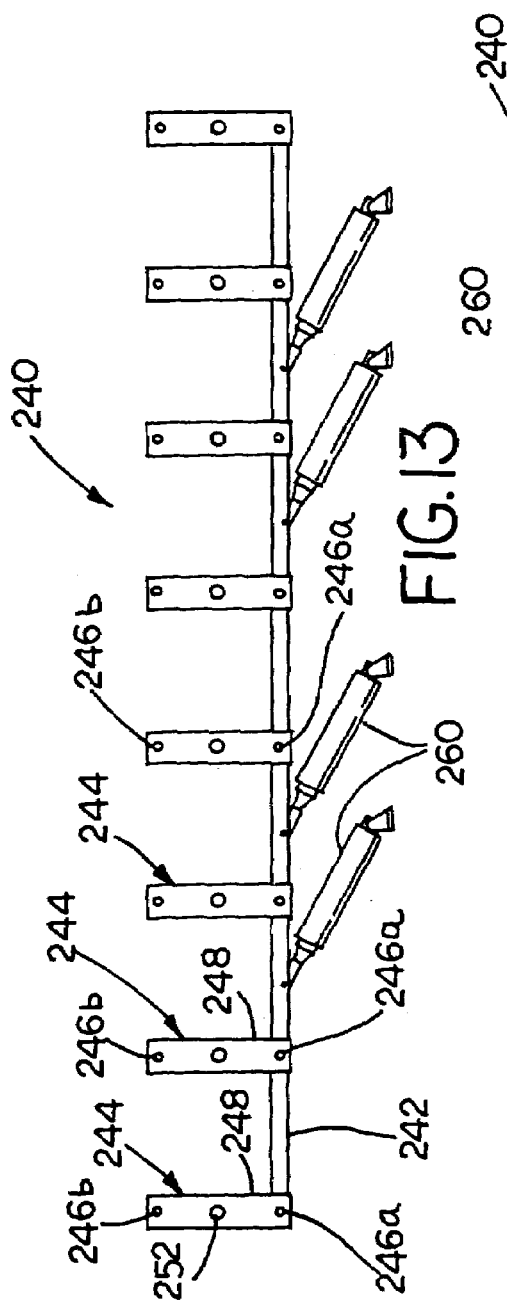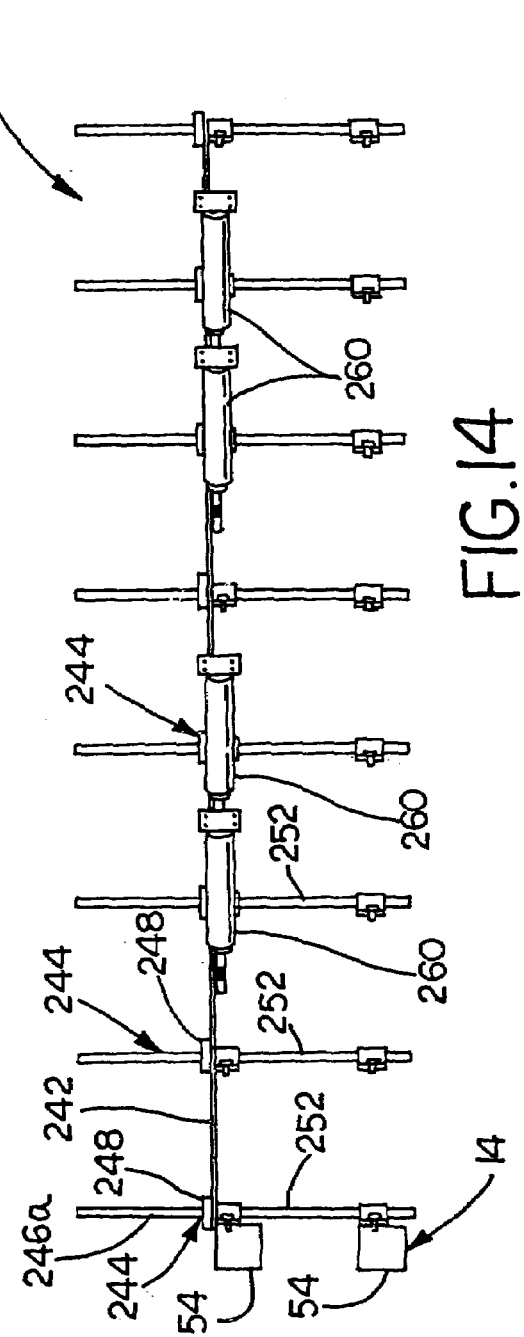

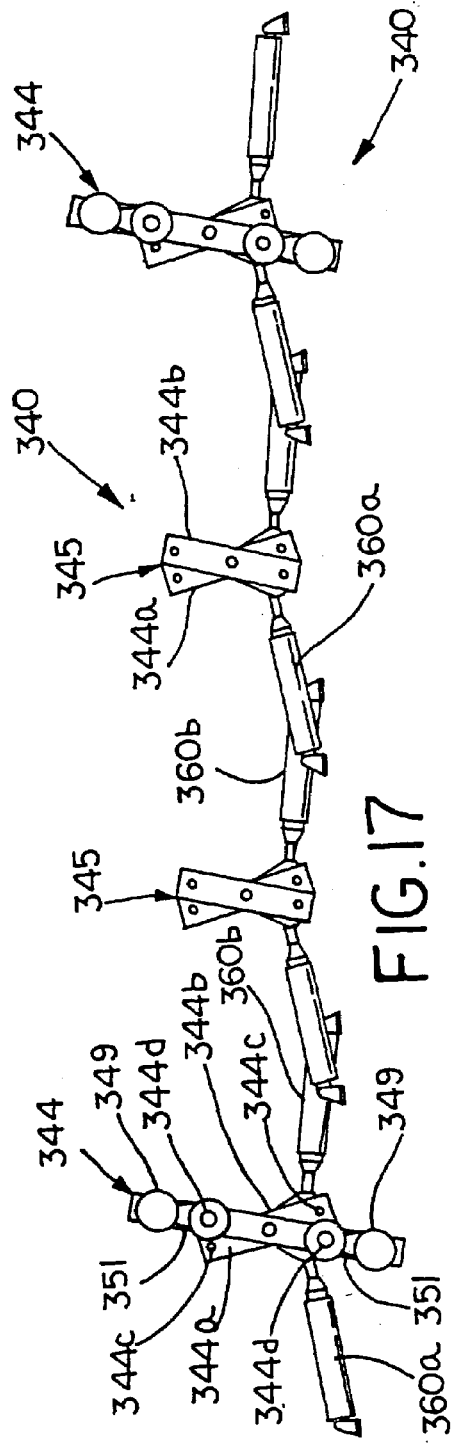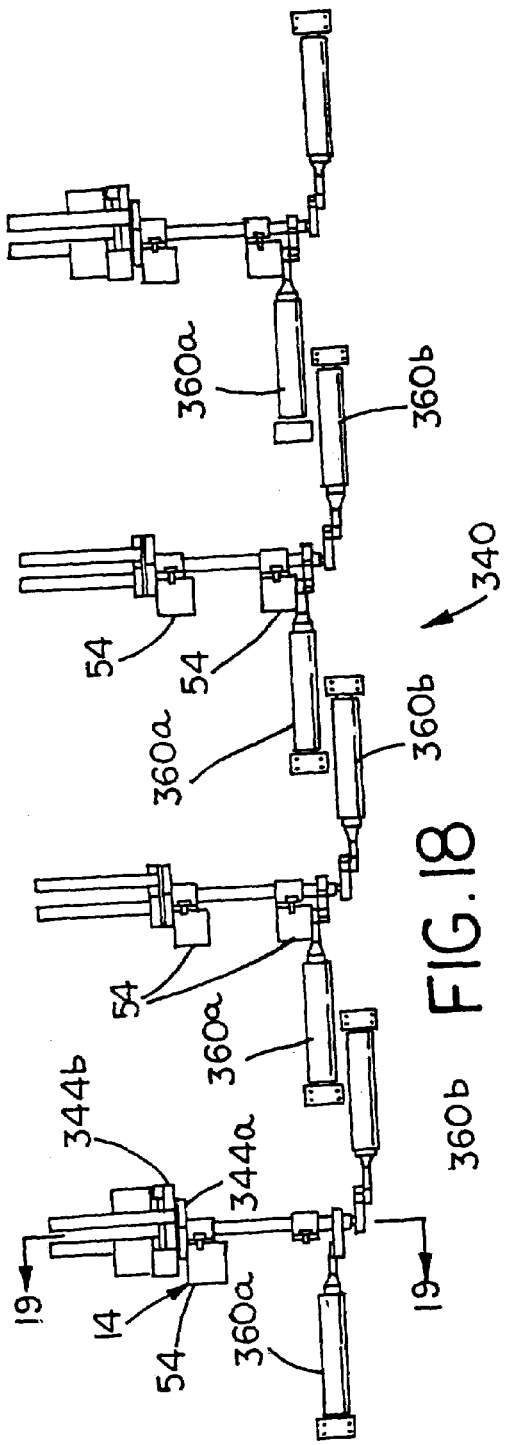

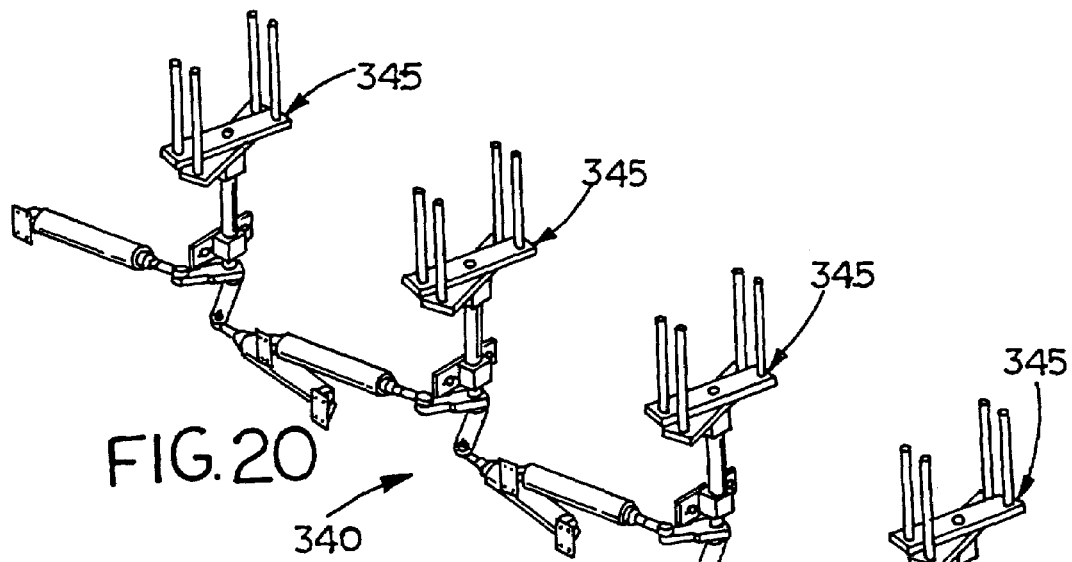
FIG. 20
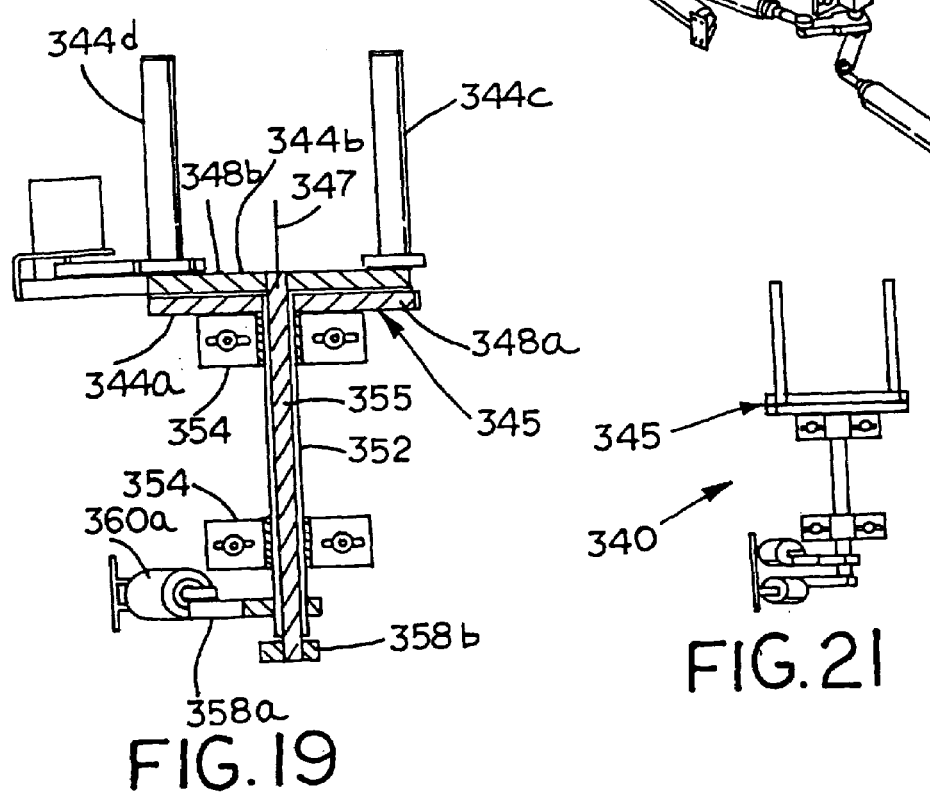
FIG. 19
FIG. 21

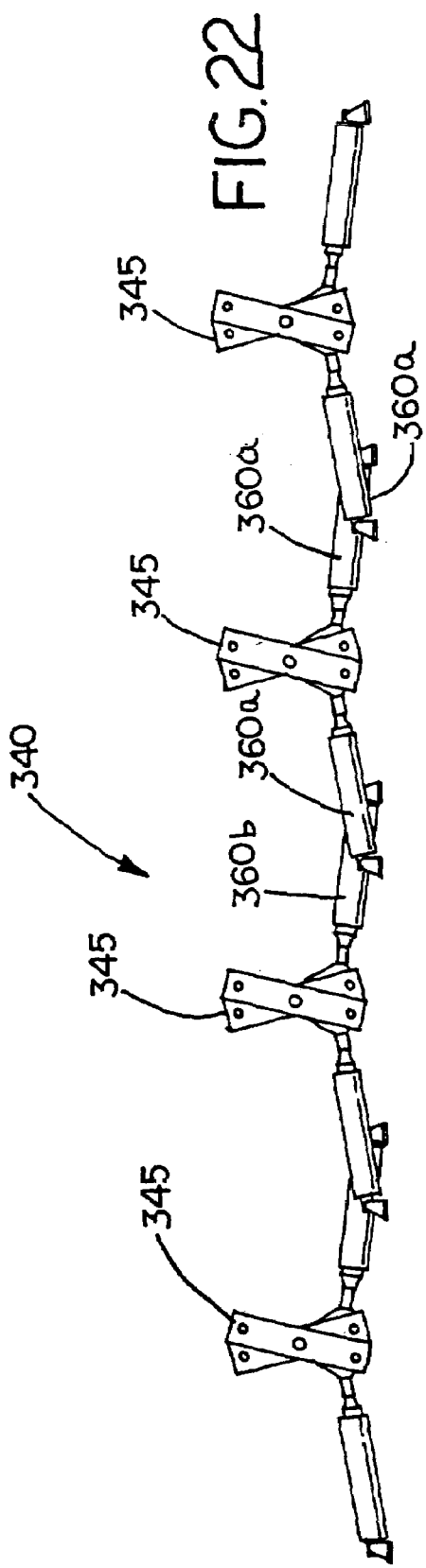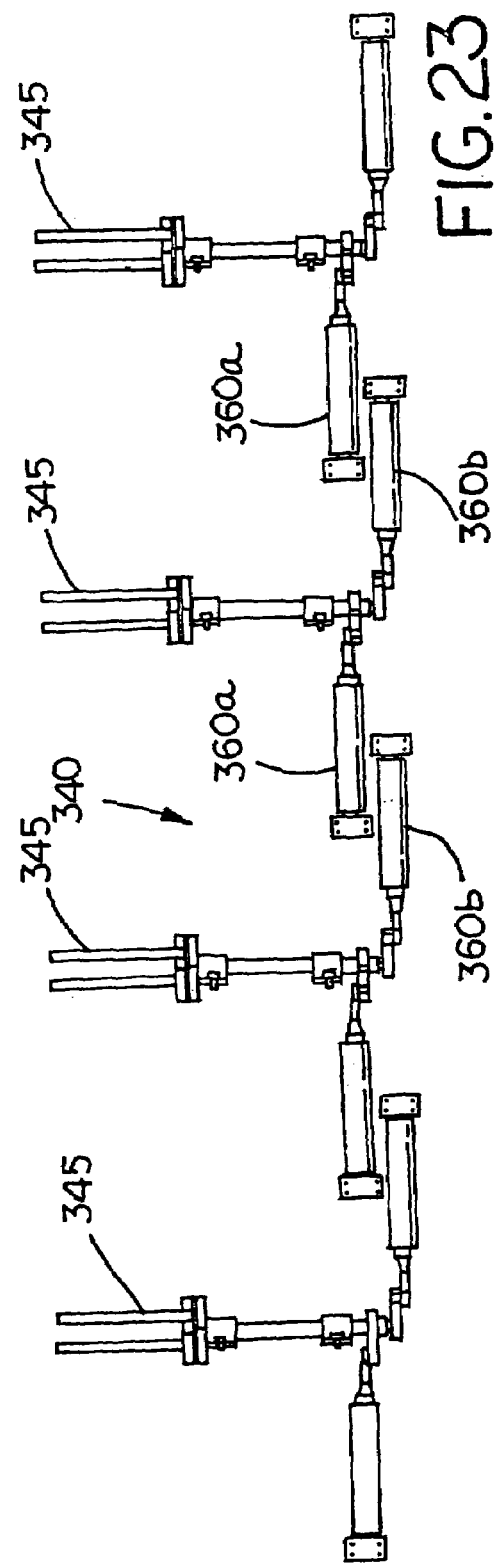

DEVICE FOR CLAMPING AND HOLDING AN ELONGATED WORKPIECE

CROSS REFERENCE TO RELATED APPLICATIONS

This application is a divisional of and claims priority to U.S. application Ser. No. 10/647,765, filed Aug. 25, 2003 and issued as U.S. Pat. No. 6,823,979 on Nov. 30, 2004, which is a divisional of U.S. application Ser. No. 09/813, 478, filed Mar. 21, 2001 and issued as U.S. Pat. No. 6,648,120 on Nov. 18, 2003), which is a continuation-in-part of U.S. application Ser. No. 09/081,223, filed May 19, 1998 and issued as U.S. Pat. No. 6,231,036 on May 15, 2001. The disclosure of these applications are hereby incorporated herein by reference in their entirety for all purposes.

FIELD OF THE DISCLOSURE

The present invention relates generally to clamping devices, and more specifically to a device that clamps a workpiece for processing.

BACKGROUND

Polyvinyl tubing is commonly used for many purposes, including by way of example rather than limitation, fencing, decking, lawn furniture, etc. In such applications, it is often required that the polyvinyl tubing be processed in one or more ways. For example, in many applications holes or slots must be cut into one or more of the sidewalls in order to accommodate mounting hardware or other associated components, or to otherwise permit a portion of one piece of tubing to be inserted into a portion of another piece of tubing. In other applications, such as polyvinyl decking systems, it may desirable to cut grooves into one surface of the tubing in order to create a non-slip surface.

The processing of such components often involves the use of a drill or router which is guided by a template or by a computerized control system. In such a process, the workpiece (e.g., a piece of tubing or some other piece of stock) must be secured in a predetermined location, with the workpiece being aligned and centered. Moreover, in order to ensure processing efficiencies, the workpiece must be quickly inserted and clamped prior to processing, and must further be quickly removed after processing. There exists a continuing need for improved clamping devices.

BRIEF DESCRIPTION OF THE DRAWINGS

FIG. 9 is a top plan view of the clamping device illustrated in FIG. 7;

FIG. 10 is a side elevational view of the device shown in FIGS. 7–9;

FIG. 13 is a top plan view of the clamping device illustrated in FIG. 11;

FIG. 14 is a side elevational view of the device shown in FIGS. 11–13;

FIG. 17 is a top plan view of the clamping device illustrated in FIG. 15,

FIG. 18 is a side elevational view of the device shown in FIGS. 15–17;

FIG. 19 is an enlarged fragmentary cross-sectional view taken along line 19—19 of FIG. 18;

FIG. 20 is a fragmentary view in perspective of a clamping device assembled in accordance with the teachings of a fifth preferred embodiment of the invention;

FIG. 21 is an end elevational view taken along line 21—21 of FIG. 20;

FIG. 22 is a top plan view of the clamping device illustrated in FIG. 20; and

FIG. 23 is a side elevational view of the device shown in FIGS. 20–22;

DETAILED DESCRIPTION

Figure 1:
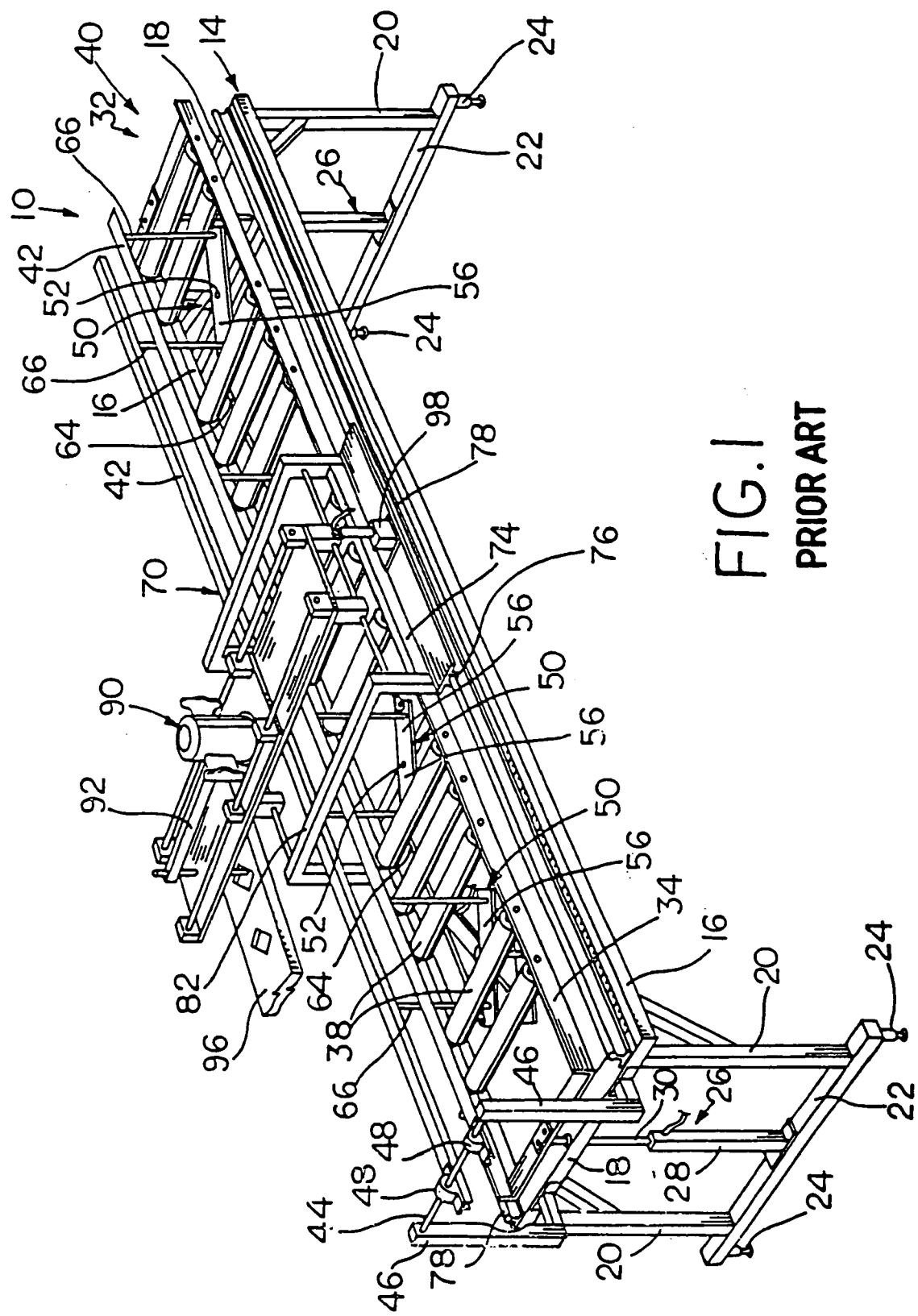
FIG. 1 is a fragmentary view in perspective of a process machine for processing elongated articles, such as polyvinyl tubing, incorporating a clamping mechanism made pursuant to the teachings of the present invention.

The following description of the disclosed embodiment is not intended to limit the scope of the invention to the precise form or forms detailed herein. Instead, the following description is intended to be illustrative of the principles of the invention so that others may follow its teachings.

Referring now to the drawings, a machine 10 for cutting openings in the side walls of an elongated workpiece 12 (FIG. 3) includes a fixed support or table generally indicated by the numeral 14, which includes a pair of longitudinal side frame members 16, and a pair of transversely extending upper end frame members 18 which interconnect the side frame members 16. Legs 20 extend downwardly from each end of both side frame members 16. A lower transverse member 22 interconnects the legs 20 on each end of the machine 10. Levelers 24 extend downwardly from each end of both lower transverse members 22. A pair of elevators 26 are installed on each of the lower transverse members 22 and consist of an outer member 28 and an inner member 30 which extends from, and retracts into, the outer member 28. The inner member 30 extends through the corresponding upper end frame member 18. The elevators 26 may be operated manually, such as by a crank, pneumatically, or in any other manner.

A conveyor generally indicated by the numeral 32 is supported along the center line defined by the side frame members 16 by the elevators 26. The conveyor 32 includes a pair of side frame members 34 which extend substantially parallel to the side frame members 16 of the fixed support or table 14. Conveyor 32 further includes transverse end members 36 which are secured to the inner members 30 of elevators 26. Accordingly, by operation of the elevators 26, the conveyor 32 may be raised and lowered relative to the fixed support or table 14. Conventional rollers 38 extends between the side members 34 and are journaled for rotation relative thereto. It will be noted that in the disclosed embodiment intermittent gaps 39 are provided between sets of the rollers 38 in which the spacing between rollers is substantially greater than the normal spacing between the rollers 38.

A clamping and holding mechanism assembled in accordance with a first preferred embodiment of the invention is generally indicated by the numeral 40. The clamping and holding mechanism 40 includes a pair of longitudinally extending, transversely spaced clamping members 42 which extend generally parallel to the side frame members 16. A shaft 44 is mounted between a pair of extensions 46 extending upwardly from the end frame member 18 on one end of the support or table 14. Glides 48 are mounted on one end of each of the clamping members 42 and are slidably engaged with the shaft 44, to thereby restrain the clamping members 42 to movement transverse to the conveyor 32 and restraining the clamping members 42 against longitudinal movement. The clamping members 42 are actuated by camming members generally indicated by the numeral 50.

Figure 2:
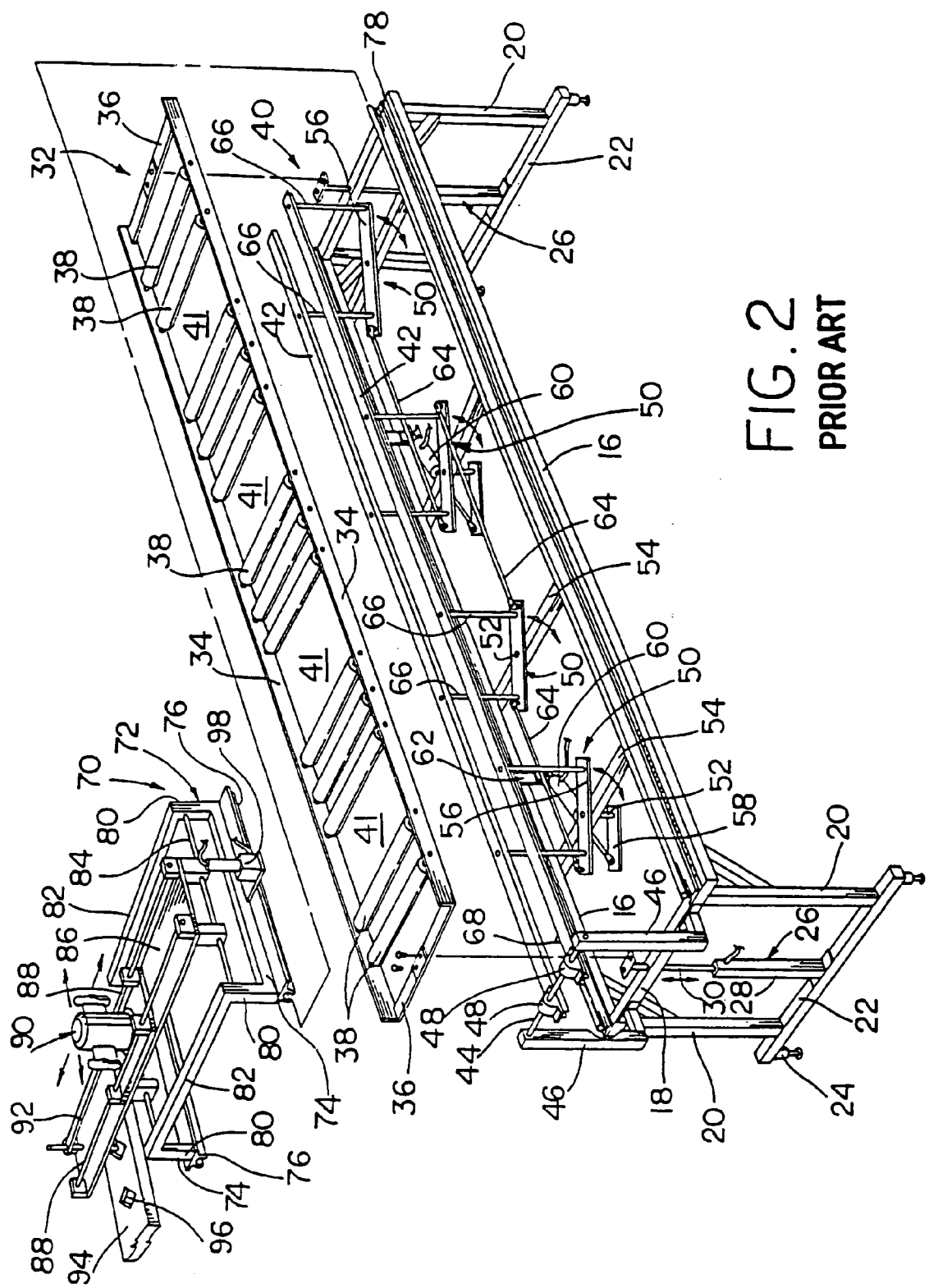
FIG. 2 is an exploded view of the apparatus illustrated in FIG. 1.

As shown in FIG. 2, each of the camming members 50 includes an axle 52 which is rotatably supported in a corresponding one of a number of cross members 54 which extend between the side frame members 16 intermediate the end frame members 18. A radially extending plate 56 is mounted for rotation with each axle 52 on the end thereof that projects above the cross members 54. A crank arm 58 is mounted for rotation with some of the axles 52 and is mounted on the end thereof extending below the cross members 54. Each of the crank arms 58 is operated by a pneumatic actuator 60 which extends between each crank arm 58 and a bracket 62 mounted on one of the side frame members 16. Alternatively, the actuators 60 may be attached directly to an end of the plate 56. In order to reduce the number of actuators 60, one or more tie rods 64 may be pivotally connected between a corresponding end of adjacent plates 56, so that rotation of any of the plates 56 will be transferred to rotate all of the other plates 56 in the same direction. Arms 66 are rigidly mounted adjacent opposite ends each of the plates 56 and extend upwardly therefrom. Each of the arms 66 engage a corresponding one of the clamping members 42.

Accordingly, when the pneumatic actuators 60 are operated to turn the crank arm 58 in the counterclockwise direction (viewed from above), the plates 56 will be rotated in the same direction and, because the arms 66 are rigidly connected to the plates 56 but pivotal and slidable relative to the clamping members 42, the clamping members 42 will move transversely toward the center line of the conveyor 32. In the disclosed embodiment, longitudinal movement of the clamping members 42 is prevented by virtue of the glides 48 slidably mounted on the shaft 44. When the pneumatic actuators are operated to rotate the crank arms 58 and plates 56 in the clockwise direction, the clamping members 42 are spread apart. One of the clamping members 42 carries a spring loaded pin 68 (FIGS. 3 and 4) that is urged outwardly from the inner edge of the clamping member to engage an end of the workpiece 12 as most clearly illustrated in FIG. 4, to thereby locate the workpiece in a predetermined position relative to the machine 10 when the work piece is processed as will hereinafter be explained.

A router carriage generally indicated by the numeral 70 includes a bridge 72 having opposite ends 74 which are provided with glides 76 to slidably engage a corresponding one of rails 78 which are mounted on the side frame members 16 and extend upwardly therefrom. Accordingly, the bridge 72 may slide along the side frame members 16 between the ends of the table or export 12. The height of the bridge is established by a number of uprights 80 50 that transverse portions 82 clear the conveyor 32 and the clamping members 42. Shafts 84 extend between corresponding pairs of the uprights 80 substantially parallel to the side frame members 16. A router support 86 is slidably mounted on the shafts 84 for movement longitudinally along the conveyor 32. The router support 86 carries a pair of transversely extending shafts 88 which slidably engage the router 90 to guide the router for movement transverse to the conveyor 32. Accordingly, by sliding relative to the shafts 84 and 88, the router 90 can be positioned at any point along the upper side of the workpiece 12 when the workpiece 12 is installed in the machine 10 and engaged by the clamping members 42. The router 90 is guided by a conventional follower arm 92 which traces on the pattern 96 incorporated within a template 94, in a manner well known to those skilled in the art. Necessary electrical connections to the router 90 are made by electrical wiring extending through a clamp 98 attached to the carriage 70.

Figure 3:
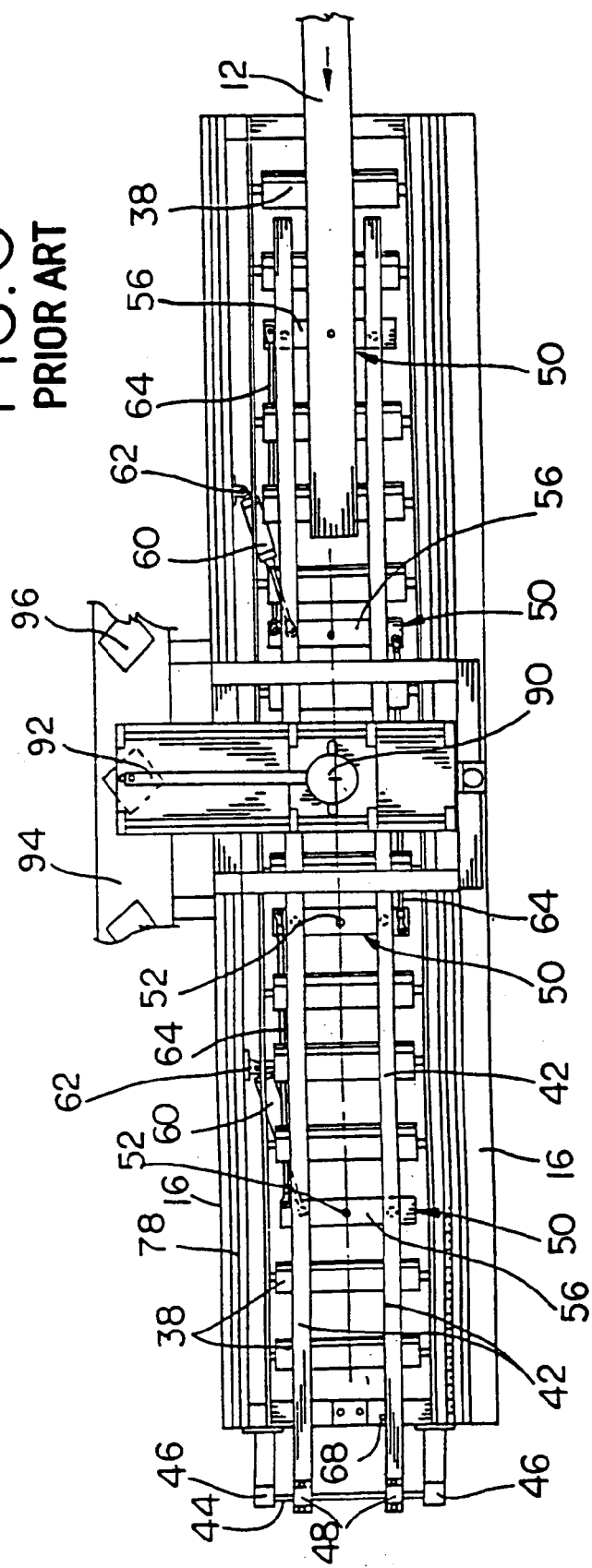
FIG. 3 is a fragmentary top plan view of the apparatus illustrated in FIG. 1 and illustrating a workpiece illustrated being conveyed onto the device.
Figure 4:
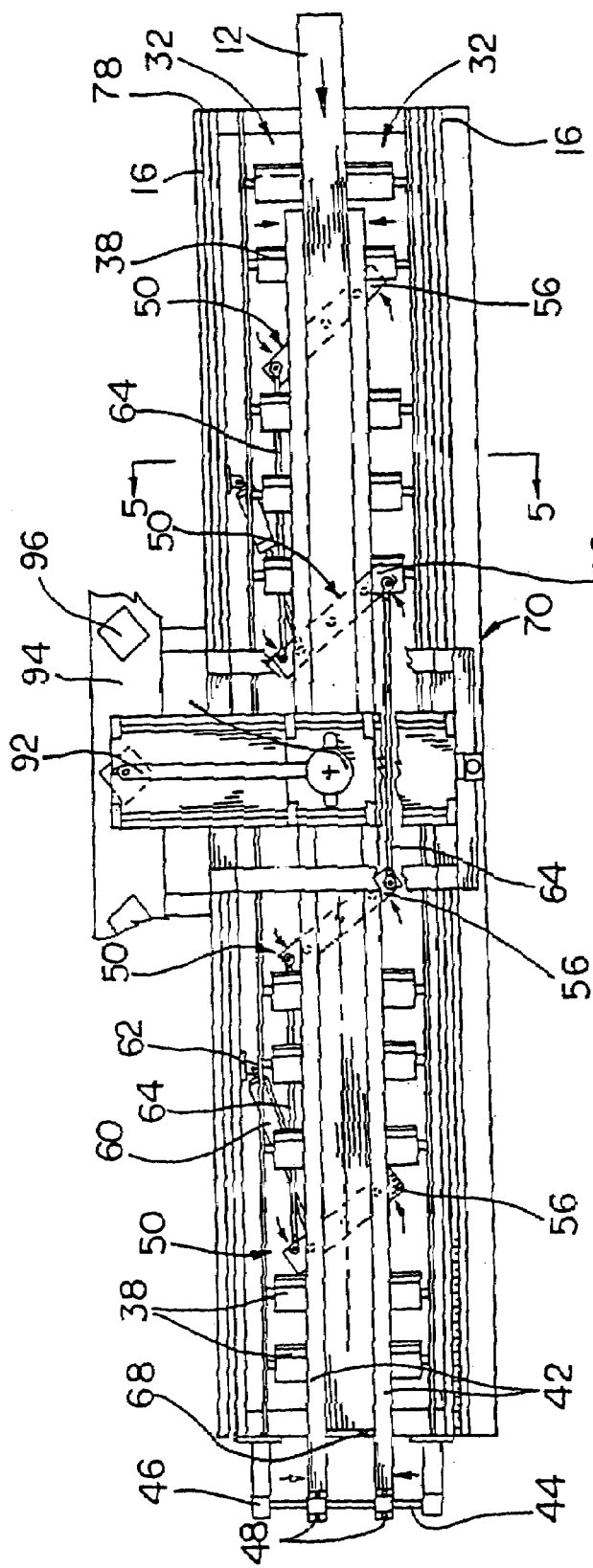
FIG. 4 is a view similar to FIG. 3, but illustrating the workpiece installed in the apparatus and with the clamping members engaging the workpiece to hold the workpiece in place for processing.
Figure 5:
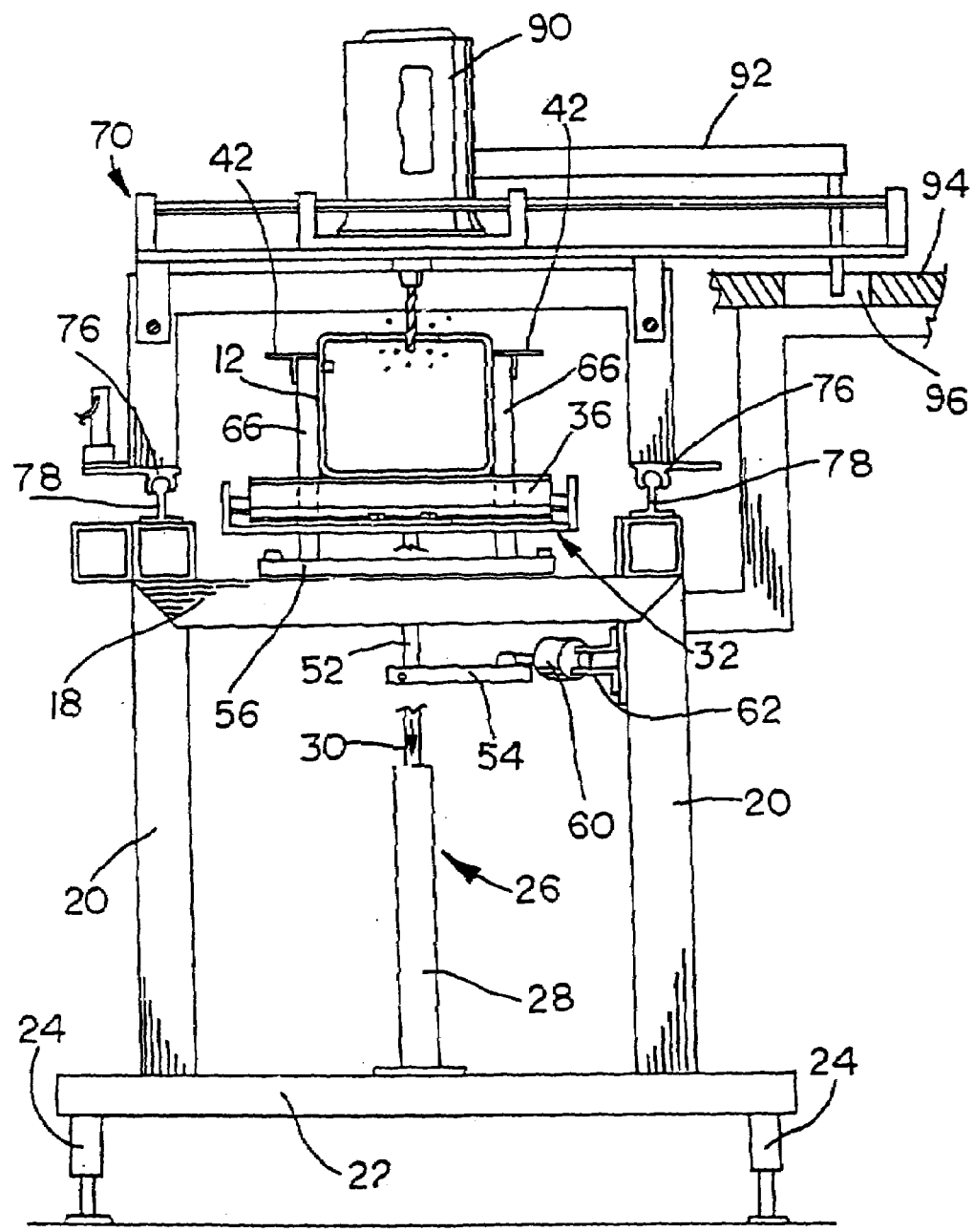
FIG. 5 is a cross-sectional view taken substantially along line 5—5 of FIG. 1.
Figure 6:
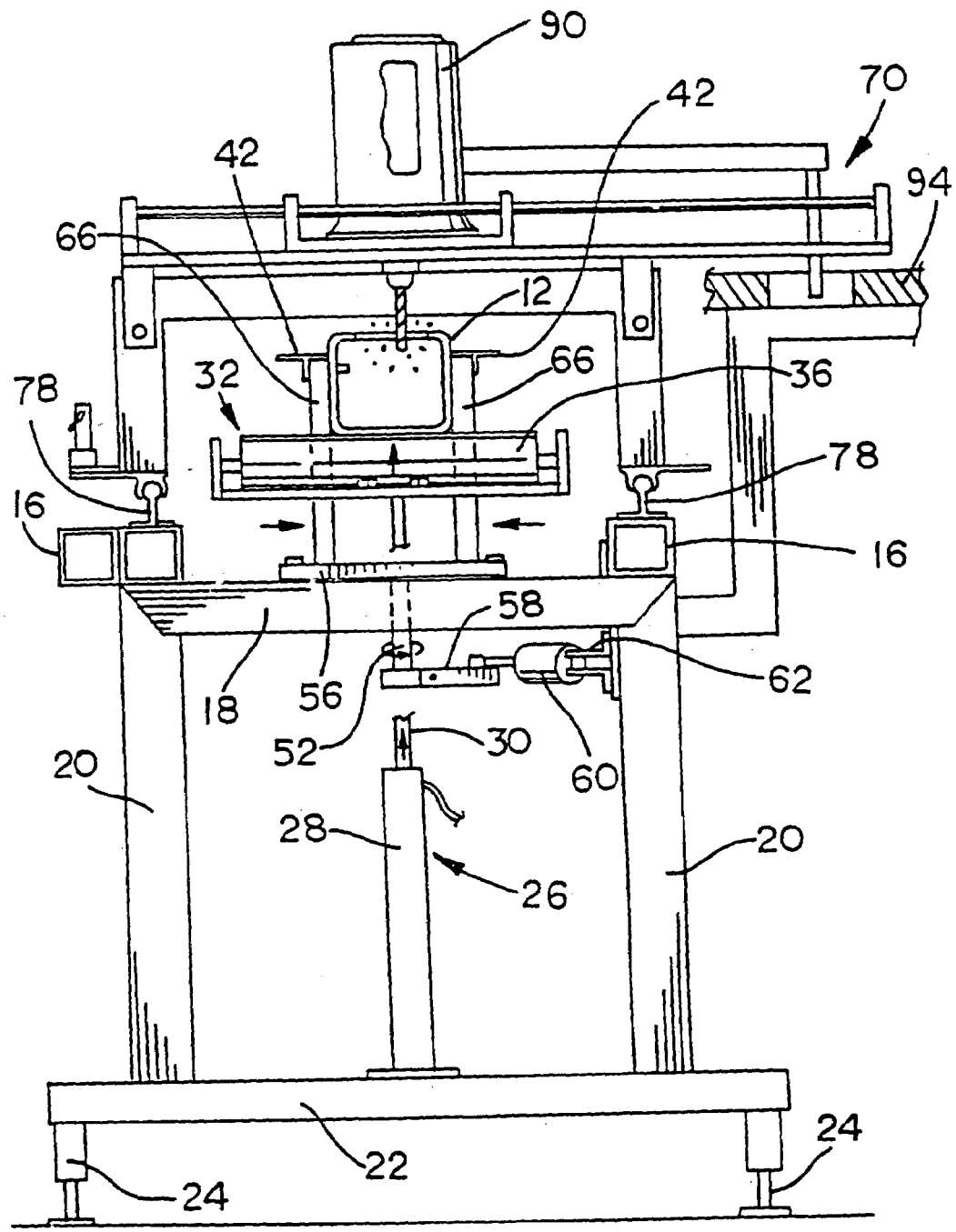
FIG. 6 is a view similar to FIG. 5, but illustrating the manner in which the device can be adjusted to accommodate a workpiece of a smaller size than the workpiece illustrated in FIG. 5.

In operation, the workpiece 12 is placed upon the rollers 38 from the right hand end of the machine 10 (viewing FIGS. 1–4). The workpiece 12 is supported by the rollers 38, and the operator may easily push the workpiece 12 into the machine 10 until the end of the workpiece 12 engages the pin 68 to locate the workpiece relative to the machine 10. The height of the conveyor 32 may be adjusted by operation of the elevators 26 to bring the workpiece 12 to the proper height where it may be engaged by the router 90 and in which the end of the workpiece will engage the spring loaded pin 68. For example, in FIG. 5, a relatively large cross section workpiece is being processed, so such that the elevators 26 are used to lower the conveyor 32. In FIG. 6 a smaller cross section workpiece is illustrated in which the conveyor 32 has been raised to properly position the workpiece 12 relative to the router 90.

After the workpiece 12 has been installed in the machine 10, the pneumatic actuators 60 are operated to rotate the camming members 50. Since the axle 52 of each camming member 50 is located along the centerline of the machine 10, rotation of the camming members 50 in the counterclockwise direction (viewed from above) causes the clamping members 42 to move towards the center line of the conveyor 32, each clamping member 42 moving towards the center line from opposite directions. Accordingly one of the clamping members 42 will engage the side of the workpiece before the other clamping member 42 engages the other side of the workpiece, unless the workpiece is aligned along the center line. The work piece will be moved transversely as the clamping members 42 close against opposite sides of the workpiece, thereby aligning the center line of the workpiece along the center line of the machine 10.

Processing of the workpiece using the router 90 may then begin. The carriage 70 is moved manually along the tracks 78 along the template 96, which extends along the side of the machine. After the follower arm 92 is installed in the pattern 96 defined in the template 94, operation of the router 90 is initiated to cut the desired apertures in the workpiece 12. Accordingly, the carriage 70 is moved manually along the workpiece to cut successive apertures or other features into the workpiece 12. Of course, it is within the scope for the invention to use the clamping mechanism with more automated types of machines, in which the router or equivalent cutting or processing device is indexed by numerical control along the length of the workpiece. It is also obviously within the scope of the invention to provide other types of processing of the workpiece other than by router, and processing of different types of workpieces, such as shafts, elongated metal parts, etc.

Referring now to FIGS. 7 through 10, a clamping and holding device assembled in accordance with the teachings of a second embodiment of the invention is shown and is referred to by the reference numeral 140. It will be understood that the clamping and holding device 140 may be suitably mounted to any suitable frame or support, such as, for example, the table 14 discussed above with respect to the first embodiment. In the disclosed embodiment, the clamping and holding mechanism 140 may be mounted to one or more of the cross members 54 (shown in fragment in FIGS. 7, 8 and 10) of the table 14. The clamping and holding device 140 includes a pair of elongated clamp rails 142a, 142b which function to engage the work piece 12 in a manner similar to that discussed above with respect to the first disclosed embodiment. It will be noted that the clamp rails 142a, 142b are disposed on opposite sides of a path along which the workpiece 12 proceeds, with the path being indicated in FIG. 7 by the reference character A. The clamp rails 142a, 142b are engaged by a plurality of clamp members 144 which are spaced apart along the path A.

Figure 7:
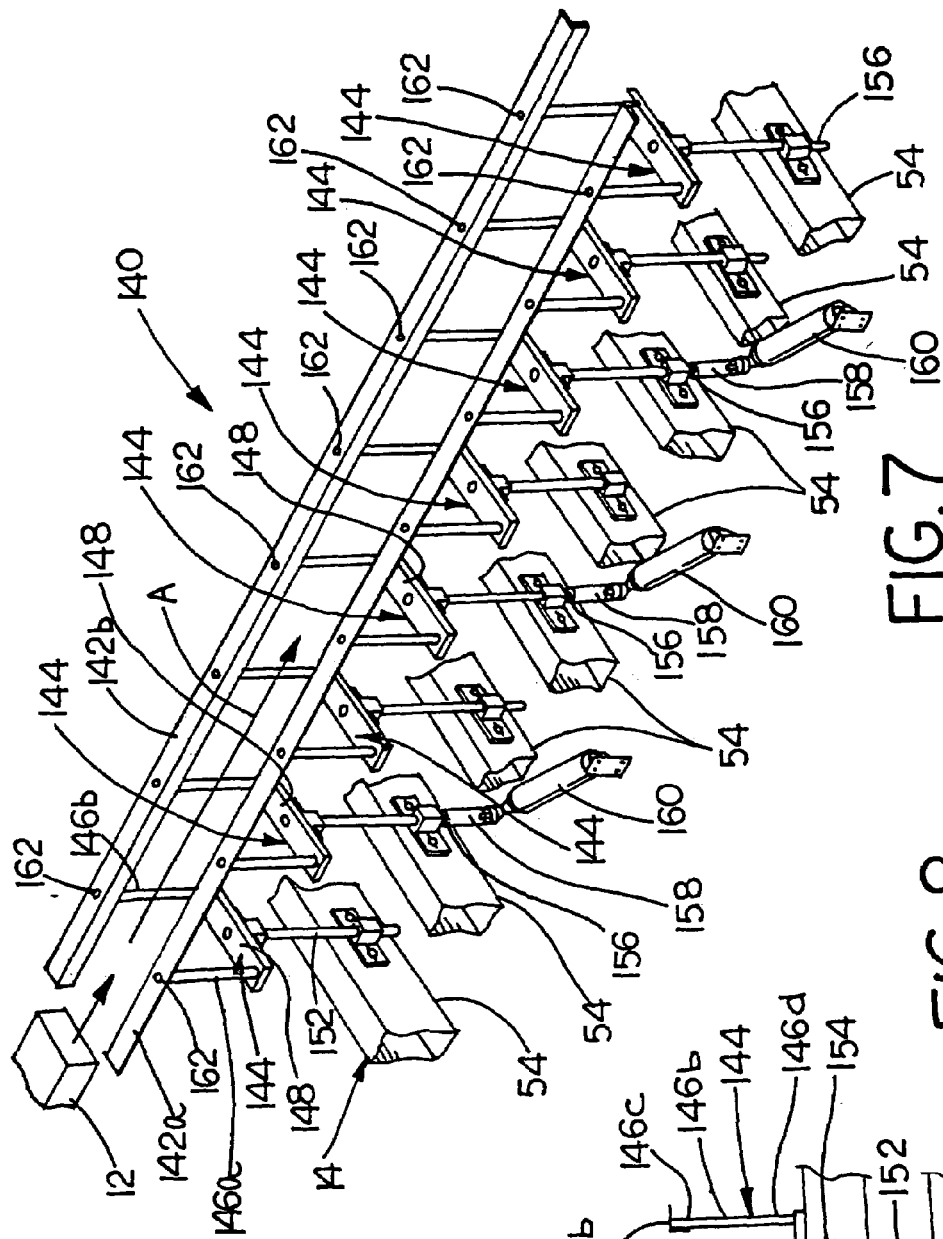
FIG. 7 is a fragmentary view in perspective of a clamping device assembled in accordance with the teachings of a second preferred embodiment of the invention.
Figure 8:
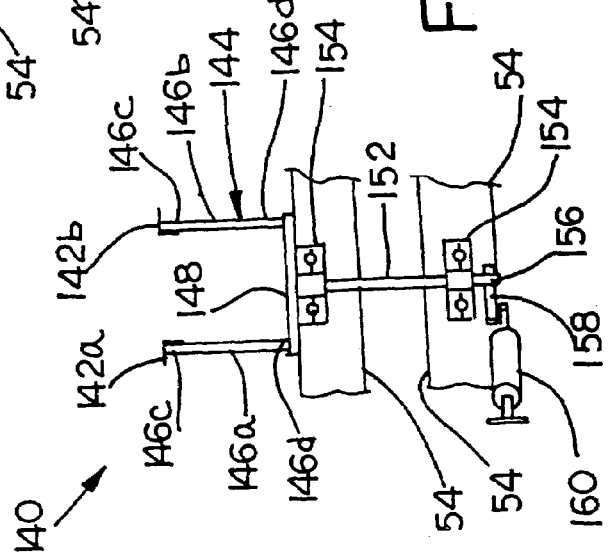
FIG. 8 is an end elevational view taken along line 8—8 of FIG. 7.
Figure 11:
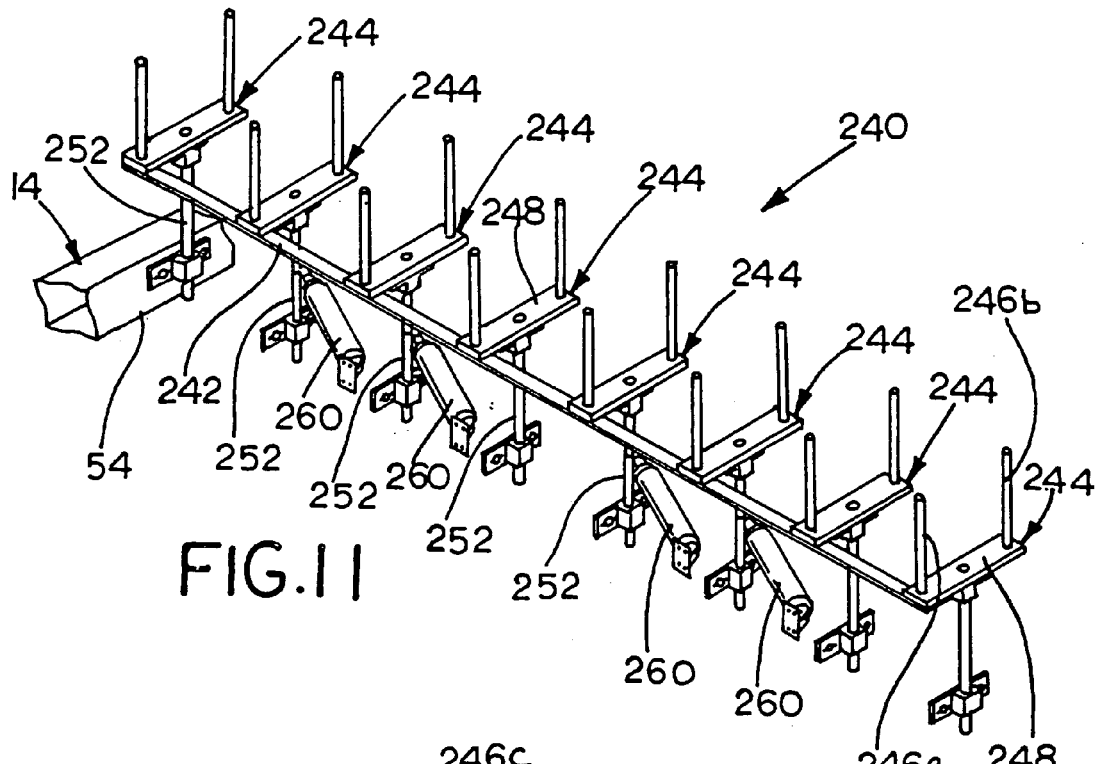
FIG. 11 is a fragmentary view in perspective of a clamping device assembled in accordance with the teachings of a third preferred embodiment of the invention.

Referring now to FIG. 8, each of the clamp members 144 includes a pair of uprights 146a, 146b, each of which has an upper end 146c which engages an adjacent one of the clamp rails 142a, 142b. Each of the uprights 146a, 146b also includes a lower end 146d. The lower ends 146d of the uprights 146a, 146b are mounted to a cross member 148, and the cross member 148 is mounted to an axle 152. The axle 152 is mounted to the cross member 54 (discussed above with respect to the first embodiment and shown in fragment in FIGS. 7, 8 and 10) 50 as to be pivotable about its longitudinal axis. In the disclosed embodiment, the axle 152 is pivotably mounted to the cross member 54 by a pair of journaled supports 154. A lower end 156 of the axle 152 extends below the lower support 154, and a lever arm 158 is mounted to the lower end 156 of the axle 152 and extends laterally therefrom. Alternatively, the axle 152 may be suitably mounted to a single journaled support 154. Further, the lever arm may extend from a central portion or an upper portion of the axle 152. Also, it will be noted when viewing FIG. 7 that not all of the clamp members 144 need include a lever arm 158. However, for each of the clamp members 144 including the lever arm 158, an actuator 160 is provided, each of which is connected to one of the lever arms 158 and also to a fixed support (not shown), such as a fixed portion of the table 14. Alternatively, the actuator 160 may be connected directly to the cross member 148. It will be understood that a number of different mechanisms may be employed to pivot the clamp members 144, such as, by way of example and not limitation, a gear mechanism or a suitable linkage mechanism. The operation of the actuators 160 is controlled by a controller 161 (illustrated schematically in FIG. 10). It will be understood that the actuators 160 (or any of the actuators discussed herein with respect to any of the disclosed embodiments) may be any suitable commercially available actuators, such as pneumatic actuators, hydraulic actuators, air over oil actuators, electric linear actuators, servo motors, stepper motors, or any other type of powered actuators.

Referring now to FIGS. 7 and 9, the upper end 146c of each of the uprights 146a, 146b may be pivotably connected to its corresponding clamp rail 142a, 142b, respectively, by a pivot 162. By virtue of the pivots 162, in response to rotation of the cross members 148 in the clockwise direction caused by the extension of the actuator 160, the clamp rail 142a will move to the left when viewing FIG. 9, while the clamp rail 142b will move to the right when viewing FIG. 9. It will be understood of course that the clamp rails 142a and 142b will also move inwardly toward a workstation disposed along the path A. When the operation of the actuator 160 is reversed, the clamp rails 142a and 142b will move in the opposite directions and away from the path A. As an alternative, the upper ends 146c of the uprights 146a and 146b may pivotably and slidably engage their corresponding clamp rails 142a, 142b. In such an alternative situation, each of the clamp rails 142a and 142b would be provided with a guide, such as the guides 48 which engage a transverse shaft 44 in a manner similar to that discussed above with respect to the first disclosed embodiment and which arrangement is shown in FIGS. 1, 2 and 3. It will be understood that in such an alternative arrangement the guides 48 engaging the shaft 44 will prevent longitudinal movement of the clamp rails 142a, 142b, such that they will move inward and outward in a manner similar to the movement of the rails 42 in the first embodiment.

In operation, the workpiece 12 proceeds along the path A supported by a suitable conveyor, such as the conveyor 32 discussed above with respect to the first disclosed embodiment. Once the workpiece 12 has reached the desired location, which is typically defined when the leading end of the workpiece 12 comes into contact with the spring loaded pin 68 (discussed above with respect to the first disclosed embodiment) or any other suitable stop (not shown), the actuators 160 are activated. Viewing FIG. 9, when the actuators 160 are extended, each of the clamp members 144 will pivot about its respective axle 152 in a generally clockwise direction when viewed from above. Again, the pivoting action of the clamp members 144 is provided by the actuators 160 engaging the lever arm 158 on selected ones of the clamp members 144. The rotation of the clamp members 144 causes the clamp rails 142a and 142b to move closer to the center line of the path A, such that the inward edges of the clamp rails 142a, 142b will come into contact with the side edges of the workpiece 12, thus centering and clamping the workpiece 12 at the desired workstation. The processing operations such as the drilling of holes, the cutting of grooves, or other operations, are then carried out using the router 90 or other required tools in the manner discussed in greater detail above with respect to the first disclosed embodiment.

When the processing of the workpiece 12 is complete, the actuators 160 are retracted, which once again moves the rails 142a and 142b outwardly and away from the workpiece 12, thus permitting the workpiece 12 to be conveyed off the machine 10. Another workpiece may then be processed in a similar manner.

Referring now to FIGS. 11 through 14, a clamping and holding device assembled in accordance With the teachings of a third embodiment of the invention is shown and is referred to by the reference numeral 240. The clamping and holding device 240 may be suitably mounted to any suitable frame or support, such as the table 14 discussed above with respect to the first embodiment. The clamping and holding mechanism 240 may be mounted to one or more of the cross members 54 (shown in fragment in FIG. 11) of the table 14. The clamping and holding device 240 includes an elongated link arm 242 which interconnects a plurality of clamp members 244 which are spaced apart along the path A.

Figure 12:
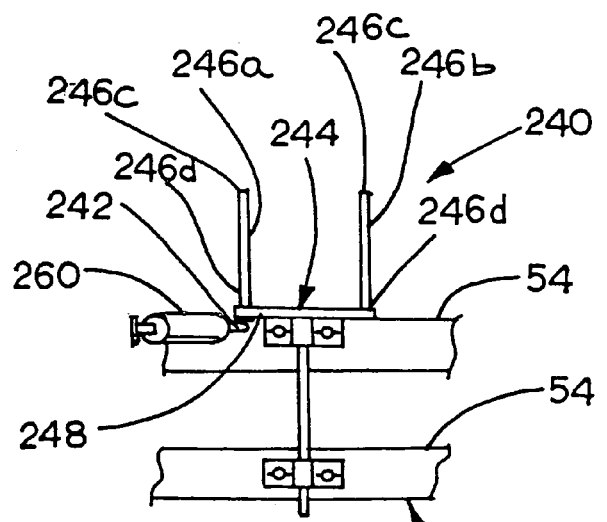
FIG. 12 is an end elevational view taken along line 12—12 of FIG. 11.
Figures 15, 16:
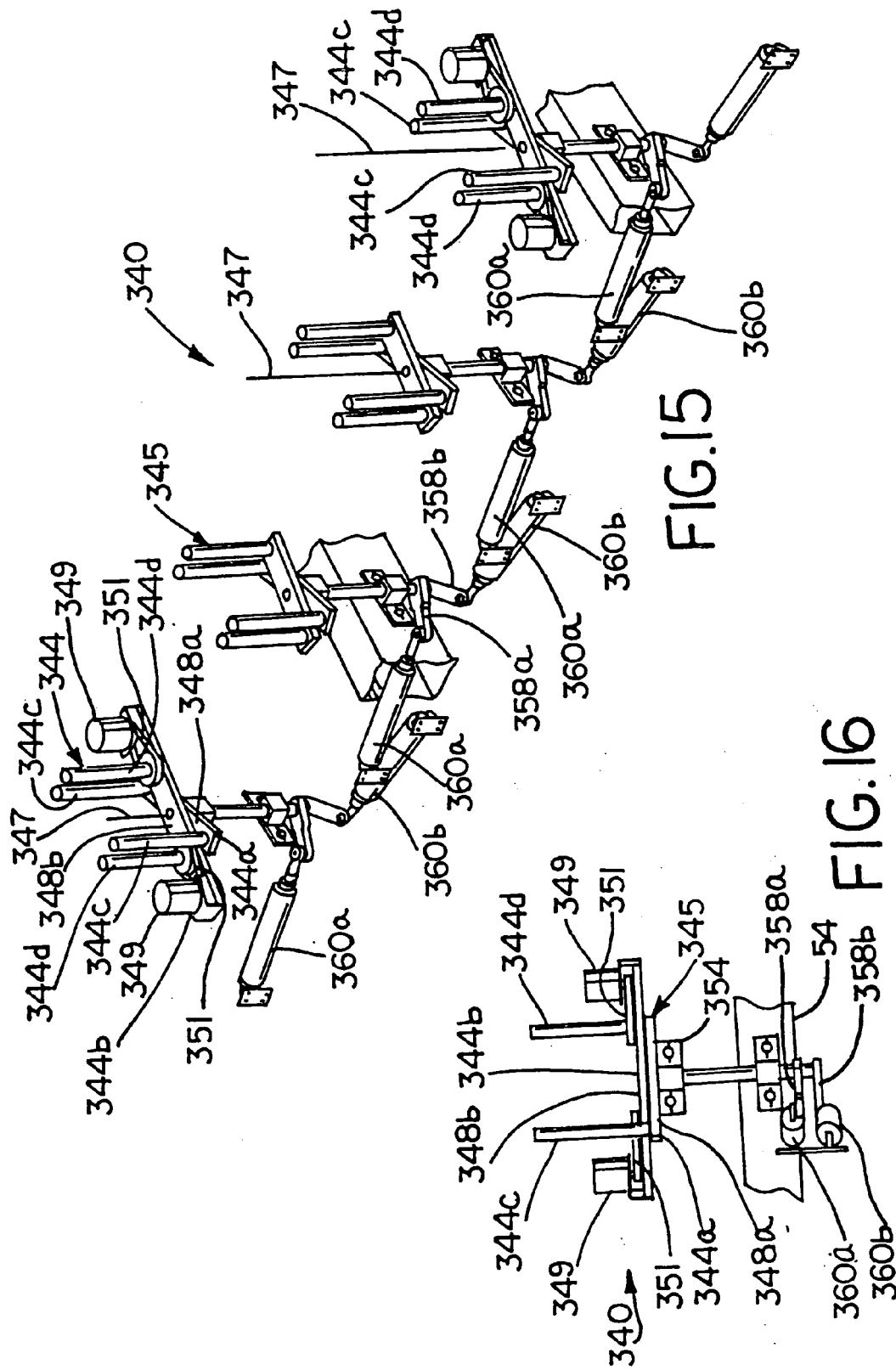
FIG. 15 is a fragmentary view in perspective of a clamping device assembled in accordance with the teachings of a fourth preferred embodiment of the invention.
FIG. 16 is an end elevational view taken along line 16—16 of FIG. 15.

Referring now to FIG. 12, each of the clamp members 244 includes a pair of uprights 246a, 246b, each of which has an upper end 246c. Each of the uprights 246a, 246b also includes a lower end 246d. The lower ends 246d of the uprights 246a, 246b are mounted to a cross member 248, and each of the cross member 248 is mounted to an axle 252. The axle 252 is mounted to the cross member 54 so as to be pivotable about its longitudinal axis. In the disclosed embodiment, the axle 252 is pivotably mounted to the cross member 54 by a pair of journaled supports 254. The link arm 242 is mounted to each of the clamp members 244, such that the rotational movement of all of the clamp members 244 about their respective axes will be synchronized (i.e., they will all move in unison). In the disclosed embodiment the link arm 244 is mounted to the cross members 248. Alternatively, the link arm 242 may be mounted to the uprights 246a or 246b. A number of actuators 260 are provided, each of which is connected to the link arm 242. Alternatively, the actuators 260 may be mounted to a lever arm (not shown) or other suitable mechanism engaging the axle 252, or the actuators 260 may be mounted directly to the clamp members 244 in order to rotate the clamp members 244. The operation of the actuators 260 is controlled by a controller 261 (illustrated schematically in FIG. 14).

In operation, the workpiece 12 proceeds along the path A supported by a suitable conveyor, such as the conveyor 32 discussed above with respect to the first disclosed embodiment. Once the workpiece 12 has reached the desired location, which again may be defined when the leading end of the workpiece 12 comes into contact with the spring loaded pin 68 (discussed above with respect to the first disclosed embodiment) or any other suitable stop (not shown), the actuators 260 are activated by the controller 261. Viewing FIG. 13, when the actuators 260 are extended, each of the clamp members 244 will pivot about its respective axle 252 in a generally clockwise direction when viewed from above. The pivoting action of the clamp members 244 is synchronized by the link arm 242. The rotation of the clamp members 244 causes the uprights 246a, 246b to move closer to the center line of the path A, such that the inward portions of the uprights 246a, 246b will come into contact with the side edges of the workpiece 12, thus centering and clamping the workpiece 12 at the desired workstation. Once again, the processing operations such as the drilling of holes, the cutting of grooves, or other operations, are then carried out using the router 90 or other required tools in the manner discussed in greater detail above with respect to the first disclosed embodiment.

Referring now to FIGS. 15 through 19, a clamping and holding device assembled in accordance with the teachings of a fourth embodiment of the invention is shown and is referred to by the reference numeral 340. The clamping and holding device 340 may be suitably mounted to any suitable frame or support, such as the table 14 discussed above with respect to the first embodiment. The clamping and holding mechanism 340 may be mounted to one or more of the cross members 54 (shown in fragment in FIG. 15) of the table 14. The clamping and holding device 340 includes a plurality of counter-pivoting clamp members 344 and a plurality of counter-pivoting clamp members 345, all of which are spaced apart along the path A.

Each of the clamp members 344 includes a first clamp 344a and a second clamp 344b, which counter-rotate relative to each other about a common pivot axis 347. The clamp 344a includes a pair of uprights 344c mounted to a common cross member 348a, while the clamp 344b includes a pair of uprights 344d mounted to a common cross member 348b. The uprights 344d are both pivotably mounted to the cross member 348b, and are both operatively connected to a drive motor 349 by a drive belt 351.

Referring now to FIG. 19, the clamp 344a is mounted to a hollow pivot axle 352 which is rotatably mounted within a pair of journaled supports 354s. The clamp 344b is mounted to a pivot axle 355 which is rotatably received within the hollow pivot axle 352. Each of the axles 352a and 352b includes a lever 358a, 358b, respectively, which extends outwardly. An actuator 360a engages the lever 358a, while an actuator 360b engages the lever 358b. The clamps 344 are similar in all respects to the clamps 345, except for the omission of the rotatable uprights and the motors 349.

In operation, the workpiece 12 proceeds along the path A. The workpiece may supported by a suitable conveyor, such as the conveyor 32 discussed above with respect to the first disclosed embodiment. However, forward motion of the workpiece 12 along the path A is caused by rotation of the uprights 344d in response to operation of the motors 349. Accordingly, the conveyor 32 need not include a separate driving mechanism. Still further, the conveyor 32 may be dispensed with in its entirety, with the functions of supporting the workpiece 12 being performed solely by the clamps 344a and 344b, and the function of moving the workpiece 12 along the path A being performed solely by the rotating uprights 344d on the clamps 344b.

Once the workpiece 12 has reached the desired location, which again may be defined when the leading end of the workpiece 12 comes into contact with the spring loaded pin 68 (discussed above with respect to the first disclosed embodiment) or any other suitable stop (not shown), the actuators 360a and 360b are activated. Viewing FIG. 17, operation of the actuators 360a and 360b will cause the uprights 344c of the clamp 344a and the uprights 344d of the clamp 344b to move inwardly in unison toward the path A, thus engaging, centering and holding the workpiece 12 at the work station. The counter-rotating pivoting action of the clamps 344a and 344b is synchronized by synchronizing the operation of the actuators 360a and 360b using any suitable control system (not shown) which control system would be within the ability of one skilled in the art. Once again, the processing operations such as the drilling of holes, the cutting of grooves, or other operations, are then carried out using the router 90 or other required tools in the manner discussed in greater detail above with respect to the previous embodiments.

Referring now to FIGS. 20 through 23, the clamping and holding device 340 is shown in which the clamp members 344 described above are eliminated, and instead only the clamp members 345 are employed. It will be understood that in such a situation the conveyor 32 discussed above with respect to the first disclosed embodiment, or any other suitable conveyor, must still be employed. In all other respects, the alternative arrangement of FIGS. 20 through 23 is essentially the same as that outlined above with respect to FIGS. 15 through 19.

Those skilled in the art will appreciate that, although the teachings of the invention have been illustrated in connection with certain embodiments there is no intent to limit the invention to such embodiments, On the contrary, the intention of this application is to cover all modifications and embodiments fairly falling within the scope of the appended claims either literally or under the doctrine of equivalents.

What is claimed is:

1. A device for clamping an elongated workpiece for processing, the workpiece having a longitudinal axis, the device comprising:
   a plurality of clamps disposed along a path, each of the clamps adapted to be shiftable between a retracted position and a clamped position, each of the clamps straddling the path and centering the workpiece when in the clamped position, each of the clamps adapted to rotate about a vertical axis oriented perpendicular to and intersecting a center of the path;
   a link arm coupled to each clamp and adapted to shift the clamps in unison; and
   at least one actuator operationally coupled to at least one of the clamps;
   wherein operation of the actuator shifts the plurality of clamps between the retracted and the clamped positions.

2. The device of claim 1, wherein each clamp includes a pair of uprights.

3. The device of claim 1, further comprising a conveyor arranged to convey the workpiece along the path to a workstation, the path being generally parallel to the longitudinal axis of the workpiece.

4. The device of claim 3, the conveyor being vertically adjustable for raising and lowering the workpiece relative to the clamps.

5. The device of claim 1, including a controller arranged to control the operation of the at least one actuator.

6. A device for clamping an elongated workpiece for processing, the workpiece having a longitudinal axis, the device comprising:
   a plurality of clamps disposed along a path, each of the clamps adapted to be shiftable between a retracted position and a clamped position, the clamps straddling the path and centering the workpiece when in the clamped position, each clamp including an axle having a vertical axis oriented perpendicular to and intersecting a center of the path, each clamp adapted to rotate about the vertical axis;
   a link arm disposed generally parallel to the path and coupled to each clamp and adapted to shift the clamps in unison; and
   at least one actuator operationally coupled to one of the clamps and arranged to shift the plurality of clamps in unison between the retracted position and the clamped position.

7. The device of claim 6, wherein the actuator is operationally coupled to the axle of one of the clamps.

8. The device of claim 6, wherein each clamp includes a pair of uprights.

9. The device of claim 6, further comprising a conveyor arranged to convey the workpiece along the path to a workstation, the path being generally parallel to the longitudinal axis of the workpiece.

10. The device of claim 9, the conveyor being vertically adjustable for raising and lowering the workpiece relative to the clamps.

11. The device of claim 6, including a controller arranged to control the operation of the at least one actuator.

* * * * *